April 1, 1952     R. L. JORDAN     2,590,973
OVERVOLTAGE RESPONSIVE CONTROL CIRCUITS
Filed March 25, 1950
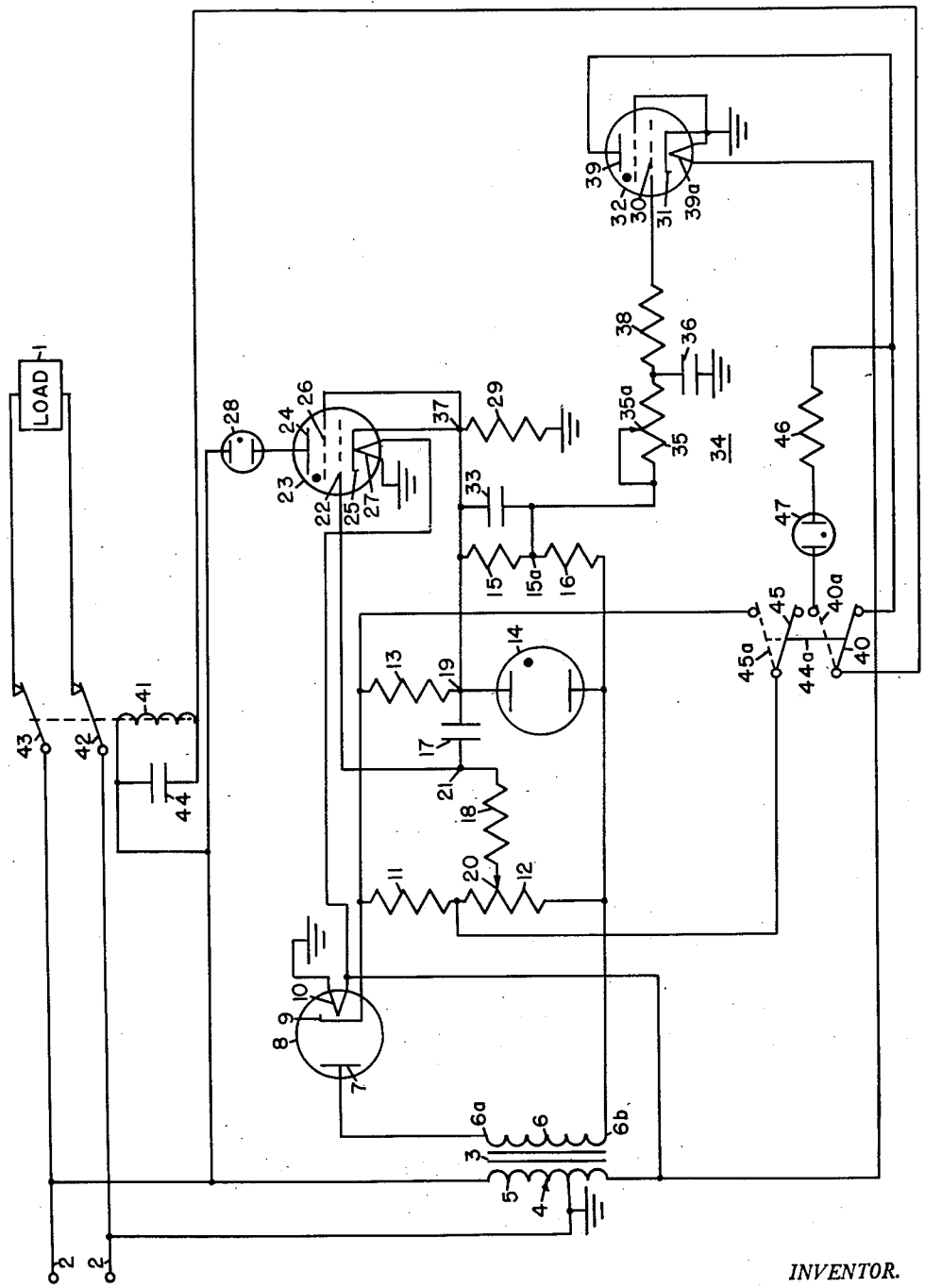
INVENTOR.
ROBERT L. JORDAN Patented Apr. 1, 1952

2,590,973

UNITED STATES PATENT OFFICE 2,590,973

OVERVOLTAGE RESPONSIVE CONTROL CIRCUITS

Robert L. Jordan, Garland, Tex.

Application March 25, 1950, Serial No. 151,891

16 Claims. (Cl. 177—311)

This invention relates to electric control circuits and more particularly to overvoltage responsive control circuits.

In many applications, electrical equipment is energized from an alternating current supply circuit whose voltage is subject to variation. It is necessary to protect the equipment against the large currents to which it would be subjected during periods of excessive voltage. The equipment is usually protected by means of an overvoltage responsive control circuit which disconnects the equipment from the alternating current source during the periods in which the voltage rises above its normal value and the equipment is subjected to excessive currents. In order to maintain the equipment in operation without unnecessary interruptions, the equipment should be disconnected only if the overvoltage condition persists over a period of such length that the excessive currents would damage the equipment. Overvoltage conditions of very short duration will not damage the equipment unless the overvoltage is of exceedingly high value. It is desirable, therefore, that the overvoltage responsive control circuit disconnect the equipment an appreciable time after the overvoltage condition appears initially if the overvoltage is of relatively low value and a very short time after the overvoltage condition appears if the overvoltage is of very high value. It is also desirable that the overvoltage responsive circuit be provided with a signal to indicate existence of overload conditions and a test circuit to test the operativeness of the overvoltage responsive circuit.

Accordingly, it is an object of my invention to provide a new and improved overvoltage responsive control circuit.

It is another object of my invention to provide a new and improved voltage responsive control circuit having a time lag which varies in accordance with the degree of departure of the voltage from a predetermined value.

It is another object of my invention to provide a new and improved overvoltage responsive control circuit provided with signal means for indicating existence of an overvoltage condition.

It is another object of my invention to provide a new and improved overvoltage responsive control circuit provided with means for testing its operativeness.

Briefly stated, in accordance with my invention I provide a new and improved overvoltage control circuit. The control circuit comprises a transformer having a primary winding connected across the alternating current supply circuit whose voltage is subject to variation. A rectifier is connected to the secondary winding of the transformer and is employed with a pair of voltage dividing bridges to produce a direct current potential which varies in accordance with the voltage of the alternating current supply circuit. The direct current potential is impressed on the control grid of a first electric valve who e anode-cathode circuit is connected in series with a first glow discharge means and a resistance across the supply circuit. The first electric valve is rendered conductive when the voltage of the supply circuit exceeds a predetermined value. Current therefore is transmitted through the first glow discharge means which glows and gives a visual indication that an overvoltage condition exists in the supply circuit. The input electrodes, control grid and cathode, of a second electric valve are connected across the above resistance and have a direct current potential impressed upon them when the first electric valve is conductive. The application of this direct current potential on the control grid and cathode of the second electric valve after the first electric valve is rendered conductive is delayed by a time delay circuit connected between the control grid and cathode of the second electric valve. The time delay is variable changing inversely as the voltage drop across the above resistance. The anode-cathode circuit is connected in series with the actuating winding of a relay which disconnects the equipment from the alternating current supply circuit when the second electric valve is rendered conductive. A test circuit is provided which renders the first electric valve conductive when a switch is moved to unbalance one of the voltage divider bridges. The test circuit also comprises a second glow discharge means which glows when the second electric valve is rendered conductive. The time interval between the commencement of glow in each of the two glow discharge devices indicates the time constant of the time delay circuit for a given voltage of the alternating current supply circuit.

For a better understanding of my invention reference may be had to the following description taken in connection with the accompanying drawing and its scope will be pointed out in the appended claims. The single figure of the accompanying drawing diagrammatically illustrates an embodiment of my invention as employed for disconnecting a load from an alternating current supply circuit upon the occurrence of an overvoltage condition in the supply circuit.

Referring now to the single figure of the accompanying drawing, I have diagrammatically illustrated my invention as applied to an over-voltage responsive control circuit for disconnecting a load 1 from an alternating current supply circuit 2. The control circuit comprises a transformer 3 having a primary winding 4 whose upper portion 5 is connected across supply circuit 2. Transformer 3 is also provided with a secondary winding 6 to one end 6a of which is connected the anode 7 of an electric discharge means 8. Electric discharge means 8 also comprises a cathode 9 and a heating element 10 and may be of any of the several types well known in the art although I prefer to employ an electric discharge means of the high vacuum type. Cathode 9 is connected to the other end 6b of secondary winding 6 through the voltage divider bridge which comprises resistances 11 and 12, through the voltage divider bridge which comprises resistance 13 and glow discharge means 14, and also through the voltage divider bridge which comprises resistances 13, 15 and 16. A capacitor 17 and resistance 18 are connected in series between the common connection 19 of resistance 13 and glow discharge means 14 and resistance 12 through an adjustable contact 20. The common connection 21 of capacitor 17 and resistance 18 is connected to the control grid 22 of an electric valve 23 and impresses on control grid 22, a direct current potential which varies in accordance with the voltage across secondary winding 6 and therefore with the voltage of supply circuit 2. Resistance 18 and capacitor 17 act as a filter to smooth out the pulsating unidirectional current transmitted by electric discharge means 8.

Electric valve 23 comprises an anode 24, a cathode 25, a shield grid 26 and a heating element 27 and is preferably of the gaseous discharge type. Anode 24 is connected to one side of alternating current supply circuit 2 through a glow discharge means 28, which may be of the neon filled type, while cathode 25 is connected to the other side of supply circuit 2 through a resistance 29. Cathode 25 and shield grid 26 are also connected to common connection 19 of resistance 13 and glow discharge means 14. Glow discharge means 14 is employed as a constant voltage drop means to ensure a relatively large change in the potential impressed on control grid 22 upon a given change in the voltage of the direct current transmitted by electric discharge means 8. Electric valve 23 is rendered conductive when the direct current potential impressed on control grid 22 exceeds a critical value. Electric valve 23, however, will conduct only during the alternate half cycles of the alternating current of supply circuit 2 during which a positive potential is impressed on anode 24. A pulsating unidirectional current therefore flows through resistance 29 when a resultant potential is impressed on control grid 22 which is more positive or less negative than the critical value. Once electric valve 23 is rendered conductive it will remain conductive during alternate half cycles until the potential impressed on control grid 22 drops below the critical value.

The control grid 30 and the cathode 31 of an electric valve 32 are connected across resistance 29 through a filter circuit which comprises resistance 15 and capacitor 33 and a time delay circuit 34 which comprises variable resistance 35 and capacitance 36. Resistance 15 and capacitor 33 are connected in parallel between the common connection 37 of resistance 29 and cathode 25 and time delay circuit 34 in order to smooth out the pulsating unidirectional current flowing to time delay circuit 34 when electric valve 23 is in a conductive state.

The voltage divider which comprises resistances 15 and 16 maintains control grid 30 at a negative potential when electric valve 23 is nonconductive. No current flows through resistance 29 at this time and common connection 37 is at ground potential which causes the common connection 15a to be below ground. When electric valve 23 becomes conductive common connection 37 is raised above ground potential and common connection 15a becomes less negative. Capacitance 36 therefore must be changed from a potential which is below ground to a potential which exceeds the critical value before electric valve 32 can be rendered conductive. The potential across resistance 15, when electric valve 23 is conductive, balances out a portion of the voltage drop across resistance 29 and biases grid 30. Small changes in the voltage of supply circuit 2 will therefore result in relatively large proportional changes in the voltage applied across time delay circuit 34 to control grid 30. Since the period of time necessary to charge capacitance 36 and raise the potential of control grid 30 to its critical value varies directly with the voltage which is applied across time delay circuit 34, the time interval between the initiation of conduction of electric valve 23 and the initiation of conduction of electric valve 32 will vary directly with the voltage of supply circuit 2. The time necessary to charge capacitor 36 of time delay circuit 34 to the critical value varies exponentially as the value of the voltage applied to time delay circuit 34 so that small changes in the voltage of supply circuit 2 will result in large variations in the time interval.

A resistance 38, whose function will be described later, is connected between time delay circuit 34 and control grid 30. Electric valve 32 also comprises an anode 39 and a heating element 39a and is preferably of the gaseous discharge type. The anode-cathode circuit of electric valve 32 is connected across alternating current supply circuit 2 through a switch blade 40 and the actuating winding 41 of a relay having contacts 42 and 43. It will be apparent that electric valve 32 and winding 41 need not be necessarily connected across supply circuit 2. They may be energized from any suitable alternating current supply circuit.

Assuming now that the voltage of alternating current circuit 2 is below a predetermined value, the potentials impressed on control grids 22 and 30 are of such values that electric valves 23 and 32 are nonconductive and contacts 42 and 43 are in the positions illustrated in the drawing. If the voltage of supply circuit 2 increases and exceeds the predetermined value, the voltage across the voltage divider bridge which comprises resistances 11 and 12 also increases, and a more positive or less negative potential is impressed on control grid 22 of electric valve 23. If this potential exceeds the critical value necessary to render electric valve 23 conductive, electric valve 23 transmits alternate half cycles of the alternating current of supply circuit 2 to resistance 29. The pulsating unidirectional current in resistance 29 causes the potential on control grid 30 of electric discharge means 32 to become more positive or less negative after a time delay determined by the time constant of time delay circuit 34 and the value of the voltage drops across resistances 29 and 15. When the potential impressed on control grid 30 exceeds the critical value, electric valve 32 transmits alternate half cycles of the alternating current of supply circuit 2 to actuating winding 41 and contacts 42 and 43 are actuated disconnecting load 1 from supply circuit 2. A capacitor 44 is connected across actuating winding 41 to smooth out the pulsating unidirectional current transmitted to winding 40.

During the half cycles during which electric valve 32 transmits current, a gaseous discharge path exists between grid 30 and cathode 31 which would allow the charge on capacitor 36 to drain off through ground if resistance 38 were not connected between capacitor 36 and control grid 30. Resistance 38 is of such value that the discharge of capacitor 36 is slowed down so that the potential impressed on control grid 30 never falls below the critical value due to the discharge of the charge on capacitor 36 between control grid 30 and cathode 31.

If the voltage of alternating current supply circuit 2 now falls back below the predetermined value, the potential impressed on control grid 22 falls below the critical value necessary to maintain electric valve 23 conductive and electric valve 23 ceases to transmit current to resistance 29. The potential drop across resistance 29 now being zero, the charge on condenser 36 discharges through resistances 35, 15 and 29 and also through resistance 38 and across grid 30 and cathode 31. The potential impressed on control grid 32 therefore also falls below the critical value and goes negative. Electric valve 32 therefore also ceases to conduct but only after an interval of time after the cessation of conduction of electric valve 23. This time interval is due to the fact that a definite amount of the charge of capacitor 36 must leak off before the potential impressed on control grid 30 falls below the critical value. Resistances 35, 15 and 29, as well as resistance 38 and the resistance between control grid 30 and cathode 31, act in combination with capacitor 36 as a time delay circuit to delay the time at which electric valve 32 becomes nonconductive after the time electric valve 23 becomes nonconductive.

The time delay circuit 34 is employed to prevent disconnection of load 1 from alternating current supply circuit 2 upon the occurrence of an overvoltage condition of such short duration, that the excessive currents to which load 1 is subjected during the period of overvoltage will not damage load 1. The number of interruptions of the operation of the equipment which constitutes load 1 is therefore kept to a minimum, load 1 being disconnected from supply circuit 2 only in the event that the excessive currents persist for a period of time of such duration as to endanger the equipment.

The time interval between the initiation of conduction of electric valve 23 and the initiation of conduction of electric valve 32 must not be a constant for an extreme overvoltage condition will subject load 1 to currents of such high intensity as to damage load 1 even though the time interval is so short that overvoltage conditions of lesser degree would not result in damage to load 1. As was set forth above, the voltage divider which comprises resistances 15 and 16 functions as a means to vary the time interval in accordance with the voltage of supply circuit 2. In order to make the time delay circuit 34 even more sensitive to the degree of overvoltage, glow discharge means 28 is connected in series with the anode-cathode circuit of electric valve 23 and with resistance 29. The voltage drop across glow discharge means 28 remains substantially constant regardless of changes in the voltage. The same is true of the voltage drop across electric valve 23 during its periods of conduction. As a result, substantially the total variation in voltage of supply circuit 2 is reflected in the voltage drop across resistance 29. The employment of glow discharge means 28 permits use of a resistance 29 of relatively low value so that the voltage drop across resistance 29 will change a relatively large amount with a given change in the voltage of supply circuit 2 when electric valve 23 is conductive. The period of delay determined by time delay circuit 34 will therefore also change a relatively large amount. If the voltage of supply circuit 2 is of a certain value when electric valve 23 is conductive, the voltage drop across resistance 29 will be of a given value and time delay circuit 34 will delay the initiation of conduction of electric valve 32 for a certain period of time. If the voltage of supply circuit 2 is higher than the certain value, a greater voltage drop will exist across resistance 29 and time delay circuit 34 will delay the initiation of conduction of electric valve 32 for a shorter period of time than in the above case. Electric valve 32 will therefore be rendered conductive at an earlier time after the initiation of conduction of electric valve 23 when the voltage of supply circuit 2 is of greater value than when it is of lower value.

Contacts 42 and 43 may be provided with latch means (not shown) which will lock contacts 42 and 43 in their actuated positions so that manual resetting of contacts 42 and 43 will be necessary to reconnect load 1 to supply circuit 2. If such latch means are not employed, contacts 42 and 43 will reconnect load 1 to supply circuit 2 whenever the voltage of supply circuit 2 falls below the predetermined value provided, however, the voltage must remain below the predetermined value for a period of time long enough to allow the charge on capacitor 36 to discharge to the point where the potential impressed on control grid 30 of electric valve 32 falls below the critical value. The period of time necessary to discharge capacitor 36 to this point depends on the values of resistance 38 and capacitor 36, and also on the values of resistances 35, 15 and 29. Load 1, therefore, will not be reconnected to supply circuit 2 upon momentary excursions of the voltage of supply circuit 2 below the predetermined value. The equipment which comprises load 1 will therefore be protected from an unnecessarily great number of starts where the period of operation of the equipment after the start would be of very short duration.

The particular predetermined value of the voltage of supply circuit 2 at which the overvoltage responsive circuit will begin to operate can be set by adjusting adjustable contact 20 on resistance 12. Similarly, the time constant of time delay circuit 34 can be set at a particular value by adjusting contact 35a on resistance 35.

It is desirable that the means be provided whereby the operativeness of the voltage responsive circuit can be easily tested without raising the voltage of supply circuit 2 above the predetermined value and without disconnecting load 1 from supply circuit 2. In order to test the operativeness of the overvoltage responsive circuit, I provide a double pole, double throw switch 44a whose blade 45 shunts resistance 11 when blade 45 is in the dashed line position 45a and unbalances the voltage divider bridge which comprises resistances 11 and 12. If the circuit is operative, a potential is impressed on control grid 22, electric valve 23 is rendered conductive and glow discharge means 28 glows giving a visual signal that the portion of the overvoltage responsive circuit up to and including electric valve 23 is in operative condition.

Blade 40 of switch 44 is moved simultaneously with blade 45 and connects a resistance 46 and a glow discharge means 47 in series with the anode-cathode circuit of electric valve 32 and actuating winding 41 across supply circuit 2 when blade 40 is in its dashed line position 40a. An interval of time after the initiation of conduction of electric valve 23, whose length depends on the time constant of time delay circuit 34, electric valve 32 is rendered conductive but due to the added combined resistance of resistance 46 and glow discharge means 47, the amount of current in actuating winding 41 is insufficient to actuate contacts 42 and 43. Since glow discharge means 47 glows when electric discharge means 32 is conductive, it gives a visual indication that the overvoltage responsive circuit is operative. If desired, the period of time elapsing between the time glow discharge means 28 begins to glow and the time glow discharge means 47 begins to glow may be measured to determine the time constant of time delay circuit 34. If glow discharge means 28 or glow discharge means 47 fails to glow, the overvoltage responsive circuit is inoperative, and the overvoltage responsive circuit cannot be relied upon to protect load 1 against overvoltage.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An overvoltage responsive circuit comprising: an alternating current supply circuit; a pair of electric valves, each of said electric valves comprising a pair of output electrodes including an anode and a cathode and a pair of input electrodes including a control grid and said cathode, said output electrodes of each of said electric valves being connected across said supply circuit; voltage sensing means operatively associated with said supply circuit for impressing on said input electrodes of the first of said pair of valves a potential which varies in accordance with the voltage of said supply circuit, said first electric valve being of the gaseous discharge type and being rendered conductive when the potential transcends a critical value; and means responsive to the conductivity of said first electric valve for impressing on said input electrodes of the second of said pair of electric valves a potential to render said second electric valve conductive after said first electric valve becomes conductive; and time delay means operatively associated with said first electric valve and said input electrodes of said second electric valve for delaying the time of initiation of conduction of said second electric valve from the time of initiation of conduction of said first electric valve.

2. The device of claim 1 in which the time interval between the time of initiation of conduction of said first electric valve and the time of initiation of conduction of said second electric valve varies in accordance with the voltage of said supply circuits.

3. An overvoltage responsive circuit comprising: an alternating current supply circuit; a pair of electric valves, each of said electric valves comprising a pair of output electrodes including an anode and a cathode and a pair of input electrodes including a control grid and said cathode, said output electrodes of each of said electric valves being connected across said supply circuit; voltage sensing means operatively associated with said supply circuit for impressing on said input electrodes of the first of said pair of valves a potential which varies in accordance with the voltage of said supply circuit, said first electric valve being of the gaseous discharge type and being rendered conductive when the potential transcends a critical value; a glow discharge means and a resistance connected in series with said output electrodes of said first electric valves; and a time delay circuit connected in series with said input electrodes of said second electric valve across said resistance.

4. In combination: an alternating current supply circuit; a first electric valve comprising an anode, a cathode and a control grid; a glow discharge means and a resistance connected in series with the anode-cathode circuit of said first electric valve across said supply circuit; means operatively associated with said supply circuit for impressing on said control grid of said first electric valve a potential which varies in accordance with the voltage of said supply circuit, said first electric valve being of the gaseous discharge type and being rendered conductive when the voltage of said supply circuit exceeds a predetermined value; a second electric valve comprising an anode, a cathode and a control grid; and means operatively associated with said resistance for impressing on said control grid of said second electric valve a potential of predetermined value a predetermined period of time after said first electric valve is initially rendered conductive, said second electric valve becoming conductive when said potential of predetermined value is impressed on said control grid of said second electric valve, said predetermined period of time varying in accordance with the voltage of said supply circuit.

5. The device of claim 4, and relay means operatively associated with the anode-cathode circuit of said second electric valve and responsive to the conductivity of said second electric valve.

6. In combination: an alternating current supply circuit; a first electric valve comprising an anode, a cathode and a control grid; a glow discharge means and a resistance connected in series with the anode-cathode circuit of said first electric valve across said supply circuit; means operatively associated with said supply circuit for impressing on said control grid of said first electric valve a potential which varies in accordance with the voltage of said supply circuit, said first electric valve being of the gaseous discharge type and being rendered conductive when the voltage of said supply circuit exceeds a predetermined value; a second electric valve comprising an anode, a cathode and a control grid; and means for impressing the voltage across said resistance on said control grid and said cathode, said last mentioned means comprising a time delay circuit for delaying the application of the voltage on said control grid and said cathode for a predetermined period of time after the initiation of conduction of said first electric valve.

7. The device of claim 6, and means operatively associated with said time delay circuit and said control grid of said second electric valve for delaying the cessation of conduction of said second electric valve upon the cessation of conduction of said first electric valve.

8. An overvoltage responsive circuit comprising: an alternating current supply circuit; means operatively associated with said supply circuit for producing a first potential which varies in accordance with the voltage of said supply circuit; a first electric valve connected across said supply circuit and provided with a control member; means for impressing said first potential on said control member, said first electric valve being of the gaseous discharge type and being rendered conductive when said first potential reaches a critical value; a second electric valve connected across said alternating current supply circuit and provided with a control member; means responsive to the flow of current through said first electric valve for impressing a second potential which varies in accordance with the voltage of said supply circuit on said control member of said second electric valve, said second electric valve being rendered conductive when said second potential is impressed on said control member of said second electric valve; and means operatively associated with said last mentioned means and said control member for delaying the application of said second potential to said second control member for a predetermined period of time, said predetermined period of time varying in accordance with the voltage of said alternating current supply circuit.

9. The device of claim 8, and relay means connected to said second electric valve for energization when said second electric valve is rendered conductive.

10. An overvoltage responsive circuit comprising: an alternating current supply circuit; means operatively associated with said supply circuit for producing a first potential which varies in accordance with the voltage of said supply circuit; a first electric valve connected in series with a glow discharge means and a resistance across said supply circuit, said electric valve being provided with a control member; means for impressing said first potential on said control member, said first electric valve being of the gaseous discharge type and being rendered conductive when the voltage of said supply circuit reaches a predetermined value; a second electric valve connected across said alternating current supply circuit and provided with a control member; means operatively associated with said resistance and responsive to the flow of current through said resistance for impressing a second potential which varies in accordance with the voltage of said supply circuit on said control member of said second eelctric valve, said second electric valve being rendered conductive when said second potential is impressed on said control member of said second electric valve, and means operatively associated with said last mentioned means and said control member for delaying the application of said second potential to said control member of said second electric valve for a predetermined period of time, said predetermined period of time varying in accordance with the voltage of said alternating current supply circuit.

11. The device of claim 10, and relay means connected to said second electric valve for energization when said second electric valve is rendered conductive.

12. The device of claim 3, said glow discharge means giving a visual indication of the existence of an overvoltage condition in said supply circuit.

13. The device of claim 10, said glow discharge means giving a visual indication of the existence of an overvoltage condition in said supply circuit.

14. An overvoltage responsive circuit comprising: An alternating current supply circuit; means operatively associated with said supply circuit for producing a first potential which varies in accordance with the voltage of said supply circuit; a first electric valve connected in series with a glow discharge means and a resistance across said supply circuit, said electric valve being provided with a control member; means for impressing said first potential on said control member, said first electric valve being rendered conductive when the voltage of said supply circuit reaches a predetermined value; a second electric valve connected across said alternating current supply circuit and provided with a control member; means operatively associated with said resistance and responsive to the flow of current through said resistance for impressing on said control member of said second electric valve a potential which varies in accordance with the voltage of said supply circuit, said second electric valve being rendered conductive when said potential is impressed on said control member of said second electric valve; means operatively associated with said last mentioned means and said control member for delaying the application of said second potential to said control member of said second electric valve for a predetermined period of time, said predetermined period of time varying in accordance with the voltage of said alternating current supply circuit; relay means connected to said second electric valve for energization when said second electric valve is rendered conductive; and test means for testing the operativeness of said overvoltage responsive circuit while the voltage of said supply circuit is less than the predetermined value, said test means being operatively associated with said first mentioned means for rendering said first electric valve conductive, said switch means also simultaneously connecting a glow discharge means in series with said second electric valve, said first and last mentioned glow discharge means becoming illuminated if said overvoltage responsive circuit is operative.

15. An overvoltage responsive circuit comprising: An alternating current supply circuit; means operatively associated with said supply circuit for producing a first potential which varies in accordance with the voltage of said supply circuit; a first electric valve connected in series with a glow discharge means and a resistance across said supply circuit, said electric valve being provided with a control member; means for impressing said first potential on said control member, said first electric valve being rendered conductive when the voltage of said supply circuit reaches a predetermined value; a second electric valve connected across said alternating current supply circuit and provided with a control member; means operatively associated with said resistance and responsive to the flow of current through said resistance for impressing on said control member of said second electric valve a potential which varies in accordance with the voltage of said supply circuit, said second electric valve being rendered conductive when said second potential is impressed on said control member of said second electric valve; means operatively associated with said last mentioned means and said control member for delaying the application of said second potential to said control member of said second electric valve for a predetermined period of time, said predetermined period of time varying in accordance with the voltage of said alternating current supply circuit; and test means for testing the operativeness of said overvoltage responsive circuit while the voltage of said supply circuit is less than the predetermined value, said test means comprising switch means operatively associated with said first mentioned means for rendering said first electric valve conductive, said switch means also simultaneously connecting a glow discharge means in series with said second electric valve, said first and last mentioned glow discharge means becoming illuminated if said overvoltage responsive circuit is operative.

16. An overvoltage responsive circuit comprising: An alternating current supply circuit; means operatively associated with said supply circuit for producing a first potential which varies in accordance with the voltage of said supply circuit; a first electric valve connected in series with a glow discharge means and a resistance across said supply circuit, said electric valve being provided with a control member; means for impressing said first potential on said control member, said first electric valve being rendered conductive when the voltage of said supply circuit reaches a predetermined value; a second electric valve connected across said alternating current supply circuit and provided with a control member; means operatively associated with said resistance and responsive to the flow of current through said resistance for impressing on said control member of said second electric valve a potential which varies in accordance with the voltage of said supply circuit, said second electric valve being rendered conductive when said second potential is impressed on said control member of said second electric valve; time delay means operatively associated with said first electric valve and said input electrodes of said second electric valve for delaying the time of initiation of conduction of said second electric valve from the time of initiation of conduction of said first electric valve, said time delay means comprising a circuit having a resistance and a capacitor, said capacitor having one side connected to said control grid of said second electric valve, and means for maintaining a negative charge on said one side of said capacitor when said first electric valve is non-conductive, said one side of said capacitor having a positive charge when said first electric valve is conductive, whereby a small change in the voltage of said supply circuit which renders said first electric valve conductive causes a large change in the potential impressed on said control grid of said second electric valve.

ROBERT L. JORDAN.

REFERENCES CITED

The following references are of record in the file of this patent:

UNITED STATES PATENTS

| Number | Name | Date |
| --- | --- | --- |
| 2,050,852 | Moore | Aug. 11, 1936 |
| 2,287,926 | Zepler | June 30, 1942 |
| 2,295,297 | Schneider | Sept. 8, 1942 |
| 2,460,127 | Gardiner et al. | Jan. 25, 1949 |
| 2,470,067 | Callender et al. | May 10, 1949 |
| 2,478,373 | Dahline | Aug. 9, 1949 |
| 2,483,126 | Davids | Sept. 27, 1949 |
| 2,509,027 | Zimmermann | May 23, 1950 |